United States Patent
Weis et al.

(10) Patent No.: US 11,578,804 B2
(45) Date of Patent: Feb. 14, 2023

(54) VALVE

(71) Applicant: Vitesco Technologies GmbH, Hannover (DE)

(72) Inventors: Christian Weis, Munich (DE); Eduard Cornel Petca, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 17/284,218

(22) PCT Filed: Oct. 9, 2019

(86) PCT No.: PCT/EP2019/077302
§ 371 (c)(1),
(2) Date: Apr. 9, 2021

(87) PCT Pub. No.: WO2020/074557
PCT Pub. Date: Apr. 16, 2020

(65) Prior Publication Data
US 2021/0341062 A1    Nov. 4, 2021

(30) Foreign Application Priority Data

Oct. 11, 2018    (DE) .................... 10 2018 217 449.0

(51) Int. Cl.
*F16K 1/44*        (2006.01)
*F02M 26/67*    (2016.01)
(Continued)

(52) U.S. Cl.
CPC ............. *F16K 1/443* (2013.01); *F02M 26/67* (2016.02); *F02M 26/68* (2016.02); *F02M 26/69* (2016.02)

(58) Field of Classification Search
CPC ... F16K 1/44; F16K 1/443; F16K 1/48; F16K 1/482; F02M 26/67; F02M 26/68; F02M 26/69; F02M 26/71
See application file for complete search history.

(56) References Cited

U.S. PATENT DOCUMENTS

| 1,165,315 | A |   | 12/1915 | Cameron |
| 3,012,583 | A | * | 12/1961 | Gorgens .................... F16K 1/44 |
|   |   |   |   | 137/625.34 |

(Continued)

FOREIGN PATENT DOCUMENTS

| CN | 1067723 | 1/1993 |
| CN | 101216120 | 7/2008 |

(Continued)

OTHER PUBLICATIONS

International Search Report issued in corresponding PCT Application PCT/EP2019/077302.
(Continued)

*Primary Examiner* — Hailey K. Do
(74) *Attorney, Agent, or Firm* — Cozen O'Connor

(57) ABSTRACT

A valve includes: a drive; a plunger connected to the drive; and two closing bodies connected to the plunger and movable by the plunger such that the two closing bodies are movable into abutment against respective sealing seats or away from the respective sealing seats. The two closing bodies are arranged fixedly on a sleeve, and the sleeve is slidable onto the plunger and connected fixedly to the plunger.

2 Claims, 2 Drawing Sheets

(51) Int. Cl.
*F02M 26/68* (2016.01)
*F02M 26/69* (2016.01)

(56) References Cited

U.S. PATENT DOCUMENTS

| | | | |
|---|---|---|---|
| 3,495,623 A | | 2/1970 | Jespersen |
| 3,720,234 A | | 3/1973 | Gorgens et al. |
| 6,047,690 A | | 4/2000 | Field et al. |
| 2003/0094590 A1* | | 5/2003 | Palmer .................. F16K 1/443 |
| | | | 251/264 |
| 2013/0082126 A1* | | 4/2013 | Fujita ................ F02M 21/0266 |
| | | | 239/585.1 |

FOREIGN PATENT DOCUMENTS

| | | |
|---|---|---|
| CN | 203926853 U | 11/2014 |
| DE | 1 159 715 | 12/1963 |
| DE | 2 206 827 | 8/1972 |
| DE | 11 2004 000 124 | 12/2005 |
| DE | 112004000124 B4 | 7/2011 |
| EP | 0764803 | 3/1997 |
| EP | 3 561 344 | 10/2019 |
| JP | H 05 263992 | 10/1993 |
| JP | 2002-286150 | 10/2002 |
| WO | WO 2004/081301 | 9/2004 |

OTHER PUBLICATIONS

Written Opinion issued in corresponding PCT Application PCT/EP2019/077302.

Office Action issued in corresponding DE Application No. 10 2018 217 449.0.

Chinese Office Action dated Jul. 5, 2022 issued in Chinese Patent Application No. 201980067225.X.

Grant Decision dated Oct. 18, 2022 issued in German Patent Application No. 102018217449.0.

* cited by examiner

VALVE

CROSS REFERENCE TO RELATED APPLICATIONS

This is a U.S. national stage of International application No. PCT/EP2019/077302, filed on Oct. 9, 2019, which claims priority to German Application No. 10 2018 217 449.0, filed Oct. 11, 2018, the content of each of which is incorporated herein by reference.

BACKGROUND OF THE INVENTION

1. Field of the Invention

The invention relates to a valve having a drive, a plunger connected to the drive, two closing bodies connected to the plunger and movable by the plunger such that they can be moved into abutment against respective sealing seats or away therefrom.

2. Description of the Prior Art

Such valves are used for opening and closing exhaust-gas lines in motor vehicles and are thus known. The tightness with which the valve closes the line is important for the function of such valves. In particular in the case of gases, the attainment of a low leakage rate is associated with high outlay. The valve seats and the sealing surface of the closing bodies have to bear tightly against one another. The surfaces thereof have to have high surface quality in terms of roughness and tolerances. At the same time, the sealing surface and the valve seat have to satisfy very low form tolerances. Finally, the movement of the valve body via the plunger and the drive has to meet the high demands placed on positional tolerance. For this purpose, the valve bodies are slid onto the plunger. Subsequently, the plunger is inserted into the housing, and, when the plunger has reached its installation position, the closing bodies can be fastened to the plunger. The fastening is achieved by welding. The closing bodies, which are situated deep within the housing, make access with the welding tool more difficult, as a result of which the welding process is highly cumbersome. It is furthermore known to form the closing bodies with two sealing surfaces, in order to compensate again for the production tolerances, which are necessary as a result of the complicated welding process. A disadvantage here is the additional outlay of the sealing surfaces for compensating for the production-related tolerances.

SUMMARY OF THE INVENTION

An object of the invention is therefore to provide a valve which is producible with low outlay, which at the same time has a leakage rate that is as low as possible and which works with long-term stability. A further object of the invention is to present a method for producing such a valve.

The object may be achieved by a valve in that the closing bodies are arranged fixedly on a sleeve, and the sleeve is slid onto the plunger and connected fixedly to the latter.

The provision of a sleeve which can be slid onto the plunger and to which the closing bodies are fastened makes possible the formation of a unit that can already be pre-assembled outside the valve housing and which is then slid on in the housing or, more precisely, onto the plunger. The fact that, according to the invention, some of the fastening processes can be carried out outside the housing means that, on account of the better accessibility, these can be carried out significantly more quickly and thus more simply. At the same time, in this way, the number of fastening processes to be carried out in the valve housing is reduced. Consequently, only the more easily realizable fastening processes are still to be performed in the valve housing, which further significantly reduces the outlay for the production of the valve. As a result of the construction according to the invention and the more easily realizable fastening processes, it is moreover possible to comply with the narrow tolerances and to ensure a particularly low leakage rate.

According to an advantageous configuration, a particularly reliable and long-term-stable connection of the sleeve to the plunger is achieved in that the sleeve is welded to the plunger.

In another advantageous configuration, the sleeve is pressed together with the plunger. This connection is distinguished by particularly low outlay.

In a further advantageous configuration, the closing bodies can be connected securely to the sleeve by being welded thereto.

A second object of the invention may be achieved in that at least one closing body is welded to the sleeve, the sleeve is slid onto the plunger until the closing body bears against the sealing seat, and subsequently the other closing body is welded to the sleeve and/or the sleeve is connected to the plunger.

The method according to the invention permits fastening of at least one closing body to the sleeve so as, in this way, to produce a pre-assembled unit.

The fact that the welding position is freely accessible means that the pre-assembled unit can be produced quickly and reliably. Difficult welded connections owing to the difficulty of access in the valve housing are thus avoided. The pre-assembled unit is subsequently slid onto the plunger until at least one closing body bears against its sealing seat. Then, the other closing body is pushed to the sealing seat assigned to it and is fastened to the sleeve and/or the sleeve is connected fixedly to the plunger.

In a further configuration, both closing bodies, for forming the pre-assembled unit, are welded to the sleeve before the latter is slid onto the plunger. This pre-assembled unit is also distinguished by particularly simple producibility on account of the freely accessible welding positions. The spacing tolerances of the sealing seats can be compensated through consideration of the thermal conditions during operation, and so, with this pre-assembled unit too, a valve with very low leakage rates is provided.

In an advantageous configuration, the sleeve is welded to the plunger, as a result of which a secure and long-term-stable connection is produced.

According to another advantageous configuration, the connection of the sleeve and the plunger can be achieved in that the two parts are pressed together.

BRIEF DESCRIPTION OF THE DRAWINGS

The invention will be explained in more detail on the basis of an exemplary embodiment. In the figures.

DETAILED DESCRIPTION OF THE PRESENTLY PREFERRED EMBODIMENTS

Figure 1:
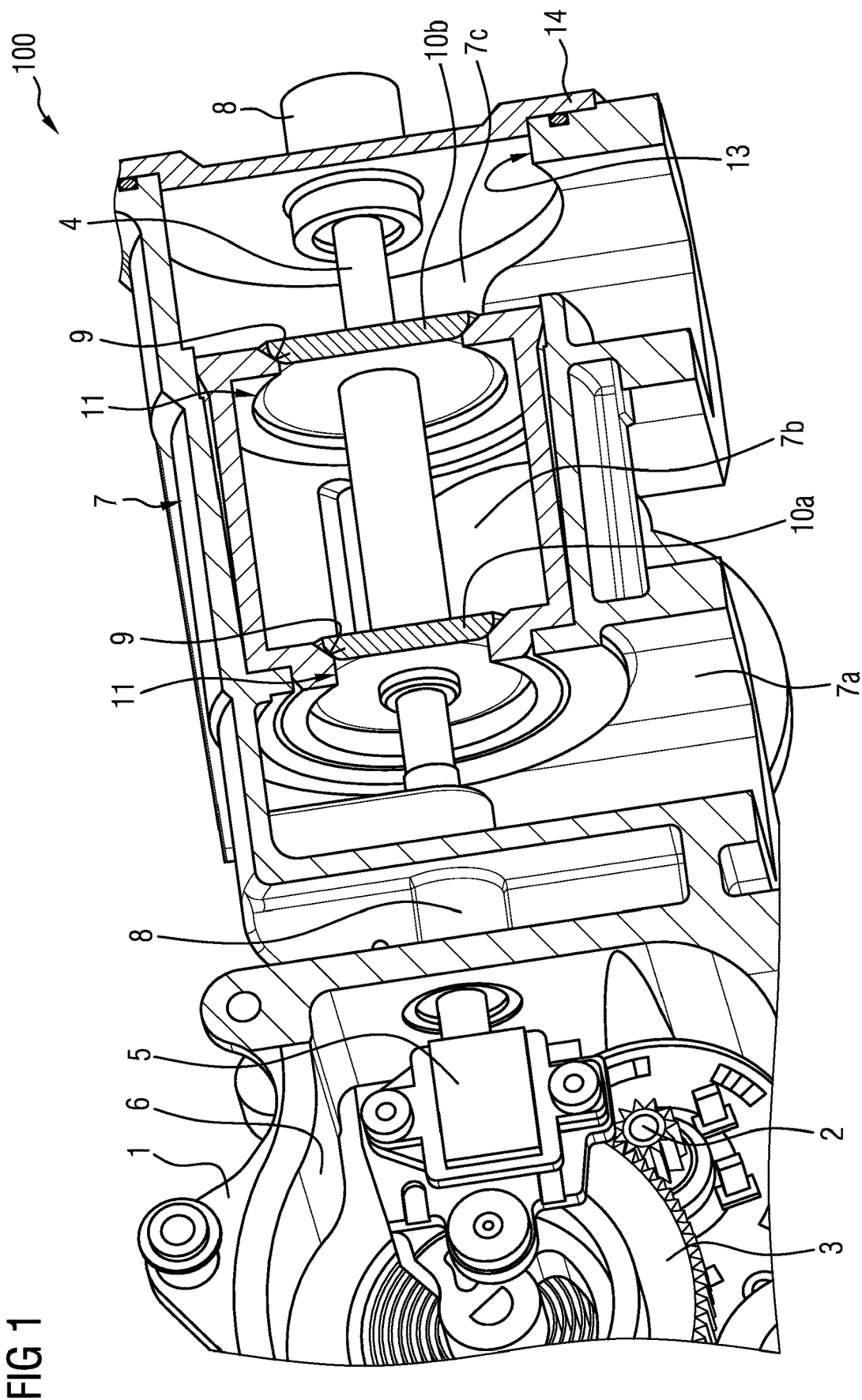
FIG. 1 shows a valve according to the prior art.

FIG. 1 shows a valve 100 according to an exemplary embodiment for opening and closing an exhaust-gas line.

The valve 100 in FIG. 1 has a housing 1, in which an electric motor 2 is arranged. The rotational movement of the electric motor 2 is converted into a linear movement of a plunger 4 by a transmission 3. A sensor 5, which interacts with a magnet fastened to the plunger 4, is arranged on the transmission 3. The plunger 4 extends from the transmission chamber 6 into a valve chamber 7, wherein the plunger 4 is mounted at two locations 8. The valve chamber 7 consists of three successive sub-chambers 7a, 7b, 7c which are separated from one another in each case by a sealing seat 9. Two closing bodies 10a, 10b are arranged on the plunger 4 such that, when the plunger 4 moves along a longitudinal axis of the plunger 4, the closing bodies bear against the respective sealing seat 9 and seal off an opening 11 or move away from the sealing seat 9 and open up the opening 11, with the result that a gas can flow from one valve chamber 7 into the other.

Figure 2:
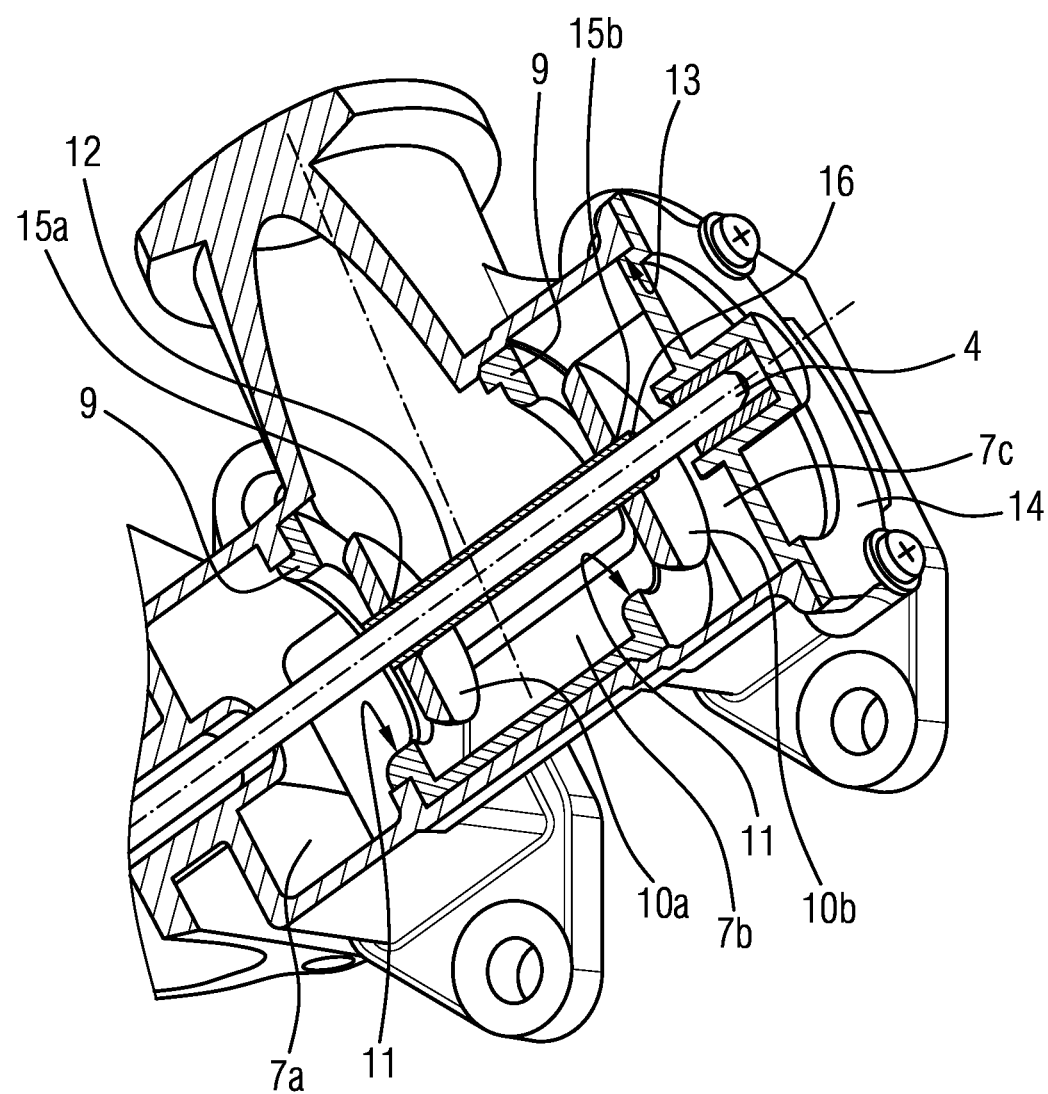
FIG. 2 shows the valve chamber of a valve according to an aspect of the invention.

In FIG. 2, a sleeve 12 bearing two disk-shaped closing bodies 10a, 10b is arranged on the plunger 4. The closing bodies 10a, 10b are welded via two welded connections 15a, 15b to the sleeve 12 such that, in the closed position of the valve, the closing bodies bear against the respective sealing seats 9 and thereby close off the openings 11, with the result that a flow of gas from one of the valve chambers 7a-c via the other of valve chambers 7a-c is not possible. In the open position of the valve, the plunger 1 moves in the direction of the chamber 7c. The closing bodies 10 move away from the sealing seats 9 such that the openings 11 are open and gas can flow out of the chamber 7b via the chambers 7a, 7c.

In the closed position of the valve, the leakage rate is almost zero. This is achieved in that the closing body 10a is slid onto the sleeve 12 and is welded to the latter by a welded connection 15a. This is realized outside the valve. The sleeve 12 and the closing body 10a form a pre-assembled unit. Subsequently, the pre-assembled unit is introduced into the housing 1, in that the sleeve 12 is slid onto the plunger 4 in the direction of the transmission 3 and is joined to the plunger. For this purpose, the pre-assembled unit is inserted through an opening 13. Here, the sleeve 12 is slid onto the plunger 4 until the closing body 10a bears against its sealing seat 9. Subsequently, the other closing body 10b is positioned on the sleeve 12 so as to likewise bear against its sealing seat 9. In this position, the closing body 10b is welded to the sleeve 12. The sleeve 12 is likewise welded to the plunger 4 by a welded connection 16. The welded connections 15b, 16 can be accessed relatively easily, as a result of which the welding processes can be carried out in a simple manner. Subsequently, the opening 13 is closed off by a cover 14 for delimiting the chamber 7c.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Rather, a person skilled in the art will take from the above description a guideline for implementation of at least one exemplary embodiment, wherein various modifications may be made, in particular with regard to the function and arrangement of the described components, without departing from the scope of protection as can be gathered from the claims and equivalent feature combinations.

The invention claimed is:

1. A method for making a valve having: a drive; a plunger connected to the drive; and two closing bodies connected to the plunger and movable by the plunger such that the two closing bodies are movable into abutment against respective sealing seats or away from the respective sealing seats, wherein the two closing bodies (10a, 10b) are arranged fixedly on a sleeve (12), and the sleeve (12) is slidable onto the plunger (4) and connected fixedly to the plunger, the method comprising:
   welding at least one of the two closing bodies (10a) to the sleeve (12);
   sliding the sleeve (12) onto the plunger (4) until the at least one of the two closing bodies (10a) bears against the respective sealing seat (9); and subsequently
   welding the other of the two closing bodies (10b) to the sleeve (12) and connecting the sleeve (12) to the plunger (4),
   wherein the connection of the sleeve (12) to the plunger (4) is by the sleeve being pressed together with the plunger (4).

2. A method for making a valve having: a drive; a plunger connected to the drive; and two closing bodies connected to the plunger and movable by the plunger such that the two closing bodies are movable into abutment against respective sealing seats or away from the respective sealing seats, wherein the two closing bodies (10a, 10b) are arranged fixedly on a sleeve (12), and the sleeve (12) is slidable onto the plunger (4) and connected fixedly to the plunger, the method comprising:
   welding at least one of the two closing bodies (10a) to the sleeve (12);
   sliding the sleeve (12) onto the plunger (4) until the at least one of the two closing bodies (10a) bears against the respective sealing seat (9); and subsequently
   welding the other of the two closing bodies (10b) to the sleeve (12) and connecting the sleeve (12) to the plunger (4),
   wherein the connection of the sleeve (12) to the plunger (4) is by welding.

* * * * *